US012654636B2

(12) United States Patent
Gronau et al.

(10) Patent No.: US 12,654,636 B2
(45) Date of Patent: Jun. 16, 2026

(54) VEHICLE POWER SUPPLY CIRCUIT

(71) Applicant: Aptiv Technologies AG, Schaffhausen (CH)

(72) Inventors: Frank Gronau, Dublin (IE); Peter Ebbinghaus, Dublin (IE); Markus Heinrich, Dublin (IE); Hendrik Poth, Dublin (IE); Christian Schaefer, Dublin (IE)

(73) Assignee: Aptiv Technologies AG, Schaffhausen (CH)

( * ) Notice: Subject to any disclaimer, the term of this patent is extended or adjusted under 35 U.S.C. 154(b) by 795 days.

(21) Appl. No.: 17/810,526

(22) Filed: Jul. 1, 2022

(65) Prior Publication Data

US 2023/0001869 A1       Jan. 5, 2023

(30) Foreign Application Priority Data

Jul. 2, 2021     (EP) ..................................... 21183558

(51) Int. Cl.

| | |
|---|---|
| *B60R 16/023* | (2006.01) |
| *B60R 16/03* | (2006.01) |
| *B60R 16/033* | (2006.01) |
| *H02J 1/102* | (2026.01) |
| *H02J 9/06* | (2006.01) |
| *H02M 3/00* | (2006.01) |
| *H02J 105/37* | (2026.01) |

(52) U.S. Cl.
CPC ...... *B60R 16/0238* (2013.01); *B60R 16/0315* (2013.01); *B60R 16/033* (2013.01); *H02J 1/102* (2013.01); *H02J 9/061* (2013.01); *H02M 3/003* (2021.05); *H02J 2105/37* (2026.01)

(58) Field of Classification Search
CPC . B60R 16/0238; B60R 16/0315; B60R 6/033; H02J 1/102; H02J 9/061; H02J 2310/48; H02M 3/003
USPC ......................................................... 307/10.1
See application file for complete search history.

(56) References Cited

U.S. PATENT DOCUMENTS

| | | | |
|---|---|---|---|
| 3,962,529 | A | 6/1976 | Kubo |
| 9,065,272 | B2 | 6/2015 | Simi |
| | | (Continued) | |

FOREIGN PATENT DOCUMENTS

| | | |
|---|---|---|
| CN | 109935415 | 6/2019 |
| CN | 212570517 | 2/2021 |
| | (Continued) | |

OTHER PUBLICATIONS

"Extended European Search Report", EP Application No. 21183558. 2, Dec. 13, 2021, 13 pages.

(Continued)

*Primary Examiner* — Michael R. Fin
(74) *Attorney, Agent, or Firm* — Harness, Dickey & Pierce, P.L.C.

(57)                    ABSTRACT

A vehicle power supply circuit including a power source input for receiving an input current having an input voltage is disclosed. A first branch and a second branch are each connected to the power source input. Each branch includes a converter for converting the input current to an output current. A first distribution unit is connected to each converter for receiving the output current and includes a plurality of first outputs for supplying power to a plurality of loads.

16 Claims, 3 Drawing Sheets

(56) References Cited

U.S. PATENT DOCUMENTS

| | | | |
|---|---|---|---|
| 10,432,017 B1 * | 10/2019 | Morales | H02J 7/00712 |
| 10,847,285 B1 | 11/2020 | Kim | |
| 10,946,818 B2 | 3/2021 | Takamatsu et al. | |
| 11,196,288 B2 * | 12/2021 | Guo | H02J 7/0063 |
| 2004/0163858 A1 | 8/2004 | Borrego et al. | |
| 2015/0326022 A1 | 11/2015 | Baragona et al. | |
| 2018/0222411 A1 * | 8/2018 | Aoki | B60L 58/12 |
| 2020/0031295 A1 | 1/2020 | Miller et al. | |
| 2021/0249894 A1 * | 8/2021 | Panfil | H02J 7/0068 |
| 2022/0234471 A1 * | 7/2022 | Morita | H02J 7/00 |
| 2023/0007816 A1 | 1/2023 | Tournabien et al. | |

FOREIGN PATENT DOCUMENTS

| | | |
|---|---|---|
| GB | 1433158 | 4/1976 |
| GB | 2001748 | 2/1979 |
| JP | S57115120 | 7/1982 |
| JP | S59154712 | 9/1984 |
| JP | S59154713 | 9/1984 |
| JP | 2014015133 | 1/2014 |
| WO | 2009147551 | 12/2009 |
| WO | 2020162808 | 8/2020 |

OTHER PUBLICATIONS

"Search Report", GB Application No. 2109529.4, Aug. 19, 2021, 2 pages.

Buechel, et al., "An Automated Electric Vehicle Prototype Showing New Trends in Automotive Architectures", Oct. 2015, pp. 1274-1279.

Schumi, et al., "Short Circuit and Avalanche Effects in 12V Power Distribution for Automated Driving", Mar. 2019, 4 pages.

"Extended European Search Report", EP Application No. 22181071.6, Oct. 7, 2022, 8 pages.

* cited by examiner

VEHICLE POWER SUPPLY CIRCUIT

INCORPORATION BY REFERENCE

This application claims priority to European Patent Application Number EP21183558.2, filed Jul. 2, 2021, the disclosure of which is incorporated by reference in its entirety.

BACKGROUND

The electric/electronic architecture (EE architecture, EEA) of vehicles has become more complex in recent times. Given the increasing prevalence of autonomous driving and the integration of enhanced safety and entertainment technologies, it is not uncommon for standard vehicles now to possess in excess of 150 electronic control units (ECUs). This has meant power supply circuits within the EEA have become increasingly important in modern vehicles, and the increase in autonomous driving technologies has accelerated this further.

In this respect, a loss of power and resulting deactivation of certain functions within the EEA would be unacceptable. For example, a loss of power to critical steering or braking modules due to a fault in the EEA could be catastrophic and lead to accidents, particularly if the vehicle is operating in an autonomous drive mode. Therefore, it is necessary to incorporate various safety devices into the EEA to mitigate the risk of loss of power to such critical modules.

As part of the above, it may sometimes also be necessary to disconnect the power supply to certain non-critical modules due to electrical failures in the power distribution, such as a short circuit. This is sometimes required to preserve the power supply or avoid interference to critical modules, as well as to prevent further damage to the EEA which could be quite severe, such as a thermal overload of cables leading to an electrical fire.

There are however shortcomings with existing architectures. In particular, conventional architectures require a balance to be struck between handling the above electrical malfunctions to secure the overall safety of the EEA, whilst maintaining the continued operation of certain critical functions under such failure situations.

A further consideration is the weight of the wiring harness itself. With conventional architectures, greater safety functionality typically requires more independent connections to the vehicle's power distribution unit or fuse box. This results in increased wiring, which not only increases wiring harness costs, but also reduces the vehicle's fuel efficiency due to the weight.

Accordingly, there is a need for an improved vehicle power supply circuit for addressing the above shortcomings.

SUMMARY

According to a first aspect, there is provided a vehicle power supply circuit including: a power source input for receiving an input current having an input voltage; and a first branch and a second branch, each branch being connected to the power source input and including: a converter for converting the input current to an output current, and a first distribution unit connected to the respective converter for receiving the output current and including a plurality of first outputs for supplying power to a plurality of loads.

In this way, a power distribution assembly may be provided in which different loads may be powered by separate branches of the power distribution architecture. Each branch may thereby provide a suitable power supply output current.

For instance, the output may be a current at an operating voltage different from the input voltage. Accordingly, with separate power supplies, such as DC/DC converters, servicing independent branches, if there is a fault in one branch, this will not affect the loads supplied by the other branch. This thereby allows for redundancy to be built into the EE architecture. For instance, power to a non-critical module on one branch may be disconnected without compromising the power supply to a critical module on another branch. Furthermore, the provision of more than one power distribution unit or fuse box provides for reduced wiring requirements because these distribution locations may be located closer to their respective nodes. As such, a scalable zonal EE architecture may be provided, for example, which can distribute power from a high voltage power source, such as an electric vehicle's battery, through a plurality of branches, with each branch providing the operating voltage independently.

In embodiments the first and second branches have corresponding converters and corresponding first distribution units. In this way, a mirrored arrangement may be provided, thereby allowing the two branches to service corresponding loads. For example, the second branch may provide power to corresponding modules to those provided by the first branch, with functionality distributed or mirrored across those modules.

In embodiments at least one of the loads supplied by the first distribution unit of the first branch is a primary module, and at least one of the loads supplied by the first distribution unit of the second branch is a back-up module to the primary module. In this way, a critical module, such as the steering module, may be provided as a primary module, and a back-up to that module, such as another steering module, may be provided as a redundancy. Accordingly, in the event of a power supply disruption on the first branch which compromises the function of the primary module, the back-up module may be activated to maintain operation of, for instance, steering functions. This thereby ensures a vehicle's critical safety functions may be maintained.

In embodiments, the vehicle power supply circuit further includes the primary module and the back-up module, wherein the primary module is connected to the first branch and the back-up module is connected to the second branch. In this way, the modules may form part of the power distribution circuit.

In embodiments, at least one of the plurality of loads is connected to the first distribution units of both the first and second branches for being supplied power thereby. In this way, certain loads, such as safety critical modules, may receive power from either branch, thereby providing redundancy for maintaining operation of those modules.

In embodiments, the vehicle power supply circuit further includes a back-up energy store connected to at least one of the first distribution units for supplying power to its respective plurality of first outputs in the absence of the output current from the respective converter. In this way, an energy store, such as a battery or supercapacitor, may be used to provide a back-up if there is an issue with the normal branch supply.

In embodiments, at least one of the first outputs of the first distribution units includes a circuit protection device for disconnecting a respective load from the output. In this way, a fuse or e-fuse for example may be used to selectively disconnect a load if a short circuit occurs. In embodiments, the circuit protection device is an electronic fuse. As such e-fuses provide a faster and more precise response than a melting fuse, this may thereby allow for reduced wiring thicknesses to be used, leading to additional cost and weight savings.

In embodiments, the first and second branches includes a switch for selectively disconnecting the respective first distribution units from the respective converter. In this way, a branch may be selectively connected or disconnected to allow loads or modules connected to that branch to be activated or deactivated as required.

In embodiments, the vehicle power supply circuit further includes a second distribution unit connected to one of the first outputs of the first branch and including a plurality of second outputs for supplying power to a plurality of second loads. In this way, a zonal architecture may be provided, allowing the second distribution units to be located in a region of the vehicle closer to its associated loads. This in turn allows shorter wiring to be used, thereby saving both weight and cost could be achieved and the complexity of the wiring harness could be reduced.

In embodiments, the second distribution unit is further connected to one of the first outputs of the second branch, and wherein the plurality of second outputs includes at least one dual power second output, wherein the dual power second output is connected to the first outputs of both the first and second branches for receiving power for supplying its respective second load. In this way, certain second loads, such as safety critical loads, may be protected by a dual power supply. As such, operation can be maintained even if there is a fault on one of the power supply branches.

In embodiments, the plurality of second outputs further include at least one single power second output, wherein the single power second output is connected to the first output of one of the first and second branches for receiving power for supplying their respective second loads. In this way, different loads may be supported by different single power supply branches.

In embodiments, at least one of the second outputs of the second distribution units includes a circuit protection device for disconnecting a respective load from the output. In this way, a fuse or e-fuse for example may be used to selectively disconnect a load if a short circuit occurs. In embodiments, the circuit protection device is an electronic fuse.

In embodiments, the vehicle power supply circuit further includes a plurality of second distribution units, wherein the plurality of second distribution units are for location at different zones of the vehicle. In this way, not only may less wiring be used, but the provision of a plurality of second distribution units allows functions to be split across multiple distribution units powered by independent power supply branches. This may thereby allow functionality to substantially maintained in the event of a single power supply fault.

In embodiments, at least one of the second outputs of the second distribution units in different zones are for supplying power to corresponding second loads associated with the respective vehicle zone. In this way, common vehicle functions in different regions may be powered independently. For example, if a lighting unit on one side of the vehicle is deactivated due to a fault, operation of the corresponding lighting unit on the other side of the vehicle may be maintained if this is supplied thorough a different second power distribution unit.

In other embodiments, further branches may be provided. In this way, additional power supply branches may be provided depending on the architecture requirements.

According to a second aspect, there is provided a vehicle power supply circuit including: a power source input for receiving an input current having an input voltage; and a first branch and a second branch, each branch being connected to the power source input and including a converter for converting the input current to an output current; and a distribution unit connected to the converters of the first and second branches for receiving their output currents and including a plurality of outputs for supplying power to a plurality of loads, wherein the outputs include at least one dual power output, and wherein the dual power output is connected to both the first and second branches for receiving power for supplying their respective loads.

In this way, a power distribution assembly may be provided in which two separate power supply branches are provided for feeding a common distribution unit. Accordingly, certain second loads, such as safety critical loads, may be protected by a dual power supply, each of which may provide a suitable power supply output current. For instance, the output may be a current at an operating voltage different from the input voltage. As such, operation can be maintained even if there is a fault on one of the power supply branches.

BRIEF DESCRIPTION OF THE DRAWINGS

Illustrative embodiments will now be described with reference to the accompanying drawings in which.

DETAILED DESCRIPTION

The present disclosure relates to a vehicle power supply circuit and power distribution architecture. The present disclosure is particularly relevant to an automotive power architecture and a scalable power supply for a zonal vehicle architecture.

Figure 1:
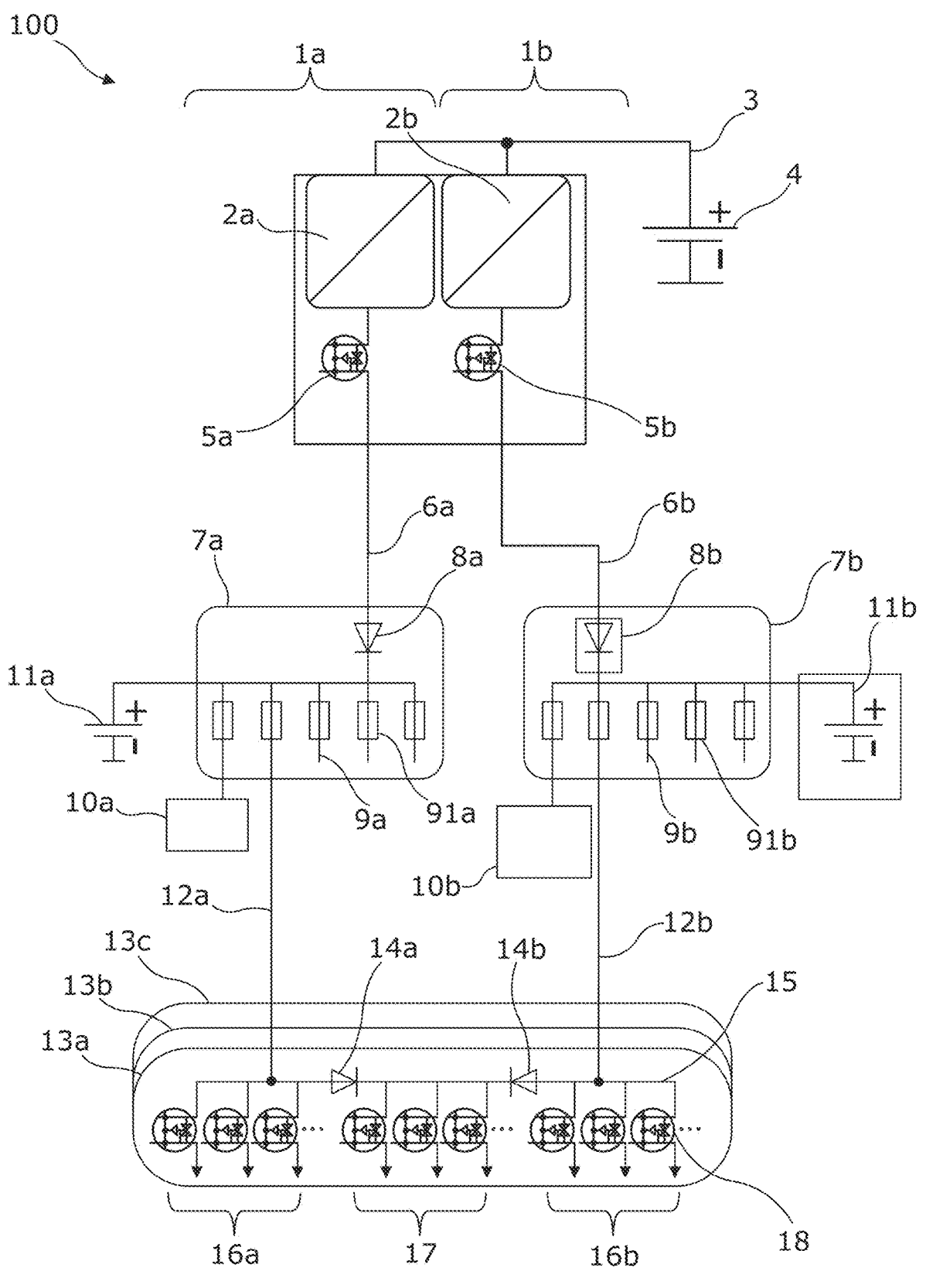
FIG. 1 shows a schematic illustration of a vehicle power distribution circuit according to a first illustrative embodiment.

FIG. 1 shows a schematic illustration of a vehicle power distribution circuit 100 which forms part of an EE architecture within a vehicle.

The power distribution circuit 100 is fed at least by one high voltage battery 4 though a power source input connector 3. In this embodiment, the high voltage battery 4 may also be used to supply very high-power loads, such as the vehicle's electric motors. Accordingly, the voltage output by the high voltage battery is much higher than the 12V operating voltage of the vehicle's electronics systems.

The power source input connector 3 feeds into two power supply branches 1a, 1b, each of which has corresponding features and thereby form a mirrored arrangement.

Each power supply branch 1a, 1b includes a DC/DC converter 2a, 2b for converting the high voltage input current supplied by the high voltage battery 4 into a 12V output current. E-fuses 5a, 5b for short circuit protection are provided at the output terminals of the DC/DC converters 2a, 2b.

The output current is fed through a power line 6a, 6b in each branch 1a, 1b to a respective fuse box 7a, 7b. The fuse boxes 7a, 7b provide first distribution units for distributing power to loads 10a, 10b through primary outputs 9a, 9b. In this embodiment, the primary outputs 9a, 9b are fed through melting fuses 91a, 91b which provide overcurrent protection. In other embodiments, e-fuses may be provided instead of, or addition to, the melting fuses 91a, 91b.

In this embodiment, each fuse box 7a, 7b is further connected to a back-up battery supply 11a, 11b to supply the loads 10a, 10b in the event of a disruption of the main supply. For instance, the back-up battery supply 11a, 11b may provide power during transient disturbances. Diodes 8a, 8b are further provided on the power line 6a, 6b to prevent reverse current from being drawn from the back-up battery supply 11a, 11b to the converters 2a, 2b in the event of a short circuit.

A plurality of secondary distribution units 13a, 13b, 13c spanning both branches 1a, 1b are further provided. In particular, one primary output 9a, 9b of each branch's fuse box 7a, 7b is fed through a respective distribution box power line 12a, 12b to a power rail 15 within the secondary distribution unit 13a. The power rail 15 feeds a plurality of secondary outputs 16, 17, each of which is protected by an e-fuse 18 and may supply power to a load.

The secondary outputs 16, 17 are divided into three subsets by first and second diodes 14a, 14b provided on the power rail 15. The first subset of secondary outputs 16a is conductively connected to the first branch 1a through the distribution box power line 12a. The first diode 14a prevents current from being drawn from the second branch 1b through to the first subset of secondary outputs 16a. The second subset of secondary outputs 16b is conductively connected to the second branch 1b through the distribution box power line 12b. The second diode 14b prevents current from being drawn from the first branch 1a through to the second subset of secondary outputs 16b. Accordingly, the first and second subsets 16a, 16b are conductively isolated from one another. The third subset of secondary outputs 17 are connected to the power rail 15 between the first and second diodes 14a, 14b. As such, these secondary outputs 17 are able to draw current from both the first and second branches 1a, 1b.

In use, the illustrative arrangement provides a scalable power supply for a zonal vehicle architecture. Firstly, high power loads 10a and 10b may be supplied by the primary outputs 9a, 9b of different branches. As the operating voltage in each branch is supplied by an independent converter 2a, 2b, this thereby allows for improved safety and isolation between the modules. For example, if one of the loads 10a is a steering module, which is safety critical to the operation of the vehicle, a corresponding back-up safety module 10b may be provided on the other branch. As such, the second branch 1b may effectively mirror the first branch 1a and provide back-up protection in the event that the power supply through the first branch 1a is compromised. Consequently, no single fault can result in the disruption of a safety critical load.

Secondly, the distribution boxes 13a, 13b, 13c allow further secondary loads to be supplied. Importantly, the distribution boxes 13a, 13b, 13c may be located in different zones of the vehicle for providing a localised power supply hub for loads in these regions. For instance, distribution boxes 13a, 13b, 13c may be provided in the four corners of the vehicle for supplying lights, comfort, and control functions in those regions. In addition, a fifth distribution box 13a, 13b, 13c may be provided, for instance, in the vehicle's doors or tailgate for powering lights and actuators. This allows for strategic placement of power distribution hubs to reduce the total wiring requirement.

Thirdly, the provision of both single and dual powered secondary outputs at the distribution boxes 13a, 13b, 13c, as well as the provision of multiple distribution boxes 13a, 13b, 13c allows functions to be maintained by different branches 1a, 1b of the power supply circuit 100. Accordingly, loads supplied by one of the first or second subsets 16a, 16b of secondary outputs 17 are isolated from disturbances that may occur on the other branch 1a, 1b. Moreover, a load connected to one of the third subset of secondary outputs 17 is afforded a dual power supply, thereby providing redundancy in the supplied power for maintaining operation even if one of the branches fails.

Further illustrative embodiments will now be described in relation to FIGS. 2 to 7. In these example, various configurations of vehicle power distribution circuits are shown with different numbers of zones and power distribution units for accommodating various sizes and complexities of EE architectures. In these further illustrative examples, the same reference numerals used in FIG. 1 have been used for common features.

Figure 2:
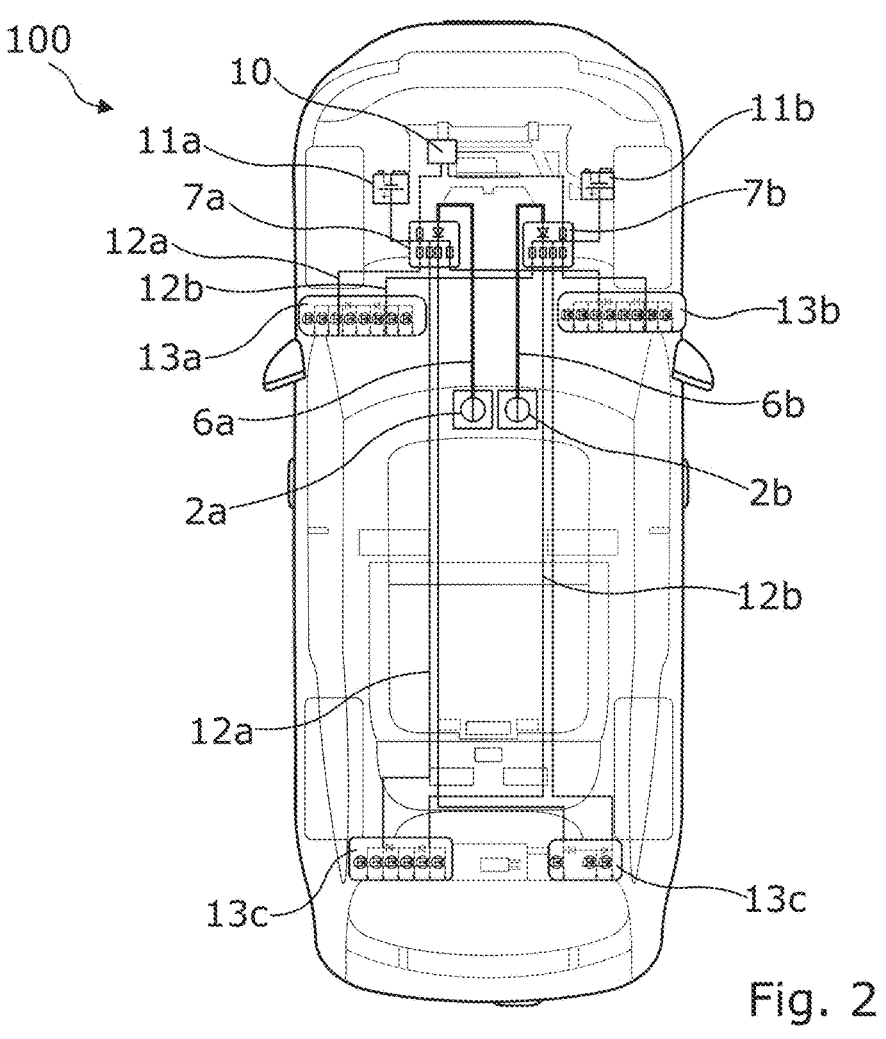
FIG. 2 shows a schematic illustration of a vehicle power distribution circuit according to second embodiment, overlaid a vehicle floorplan.

In this connection, FIG. 2 shows a vehicle power distribution circuit 100 which is similar to that shown in FIG. 1. In this case, two power supplies 2a, 2b are used to support loads 10 through first distribution units 7a, 7b, as well as through three downstream secondary distribution units 13a, 13b, 13c. As shown in context of the vehicle floorplan, the arrangement provides for optimised positioning of units, better power distribution, and shorter cabling to supported components. As such, a low cost, customizable, and scalable power distribution solution may be provided.

Figure 3:
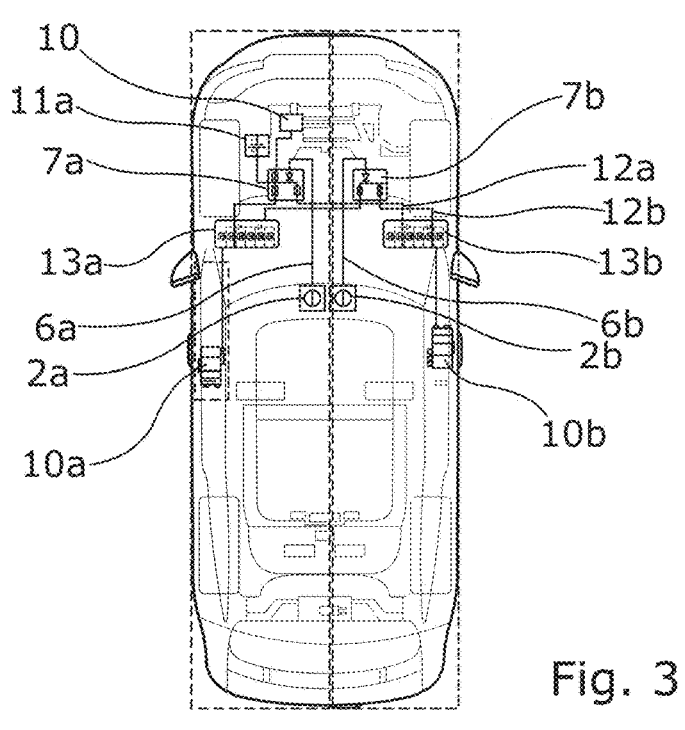
FIGS. 3-7 show further schematic illustrations of vehicle power distribution circuits according to further illustrative embodiments.
Figures 4, 5, 6, 7:
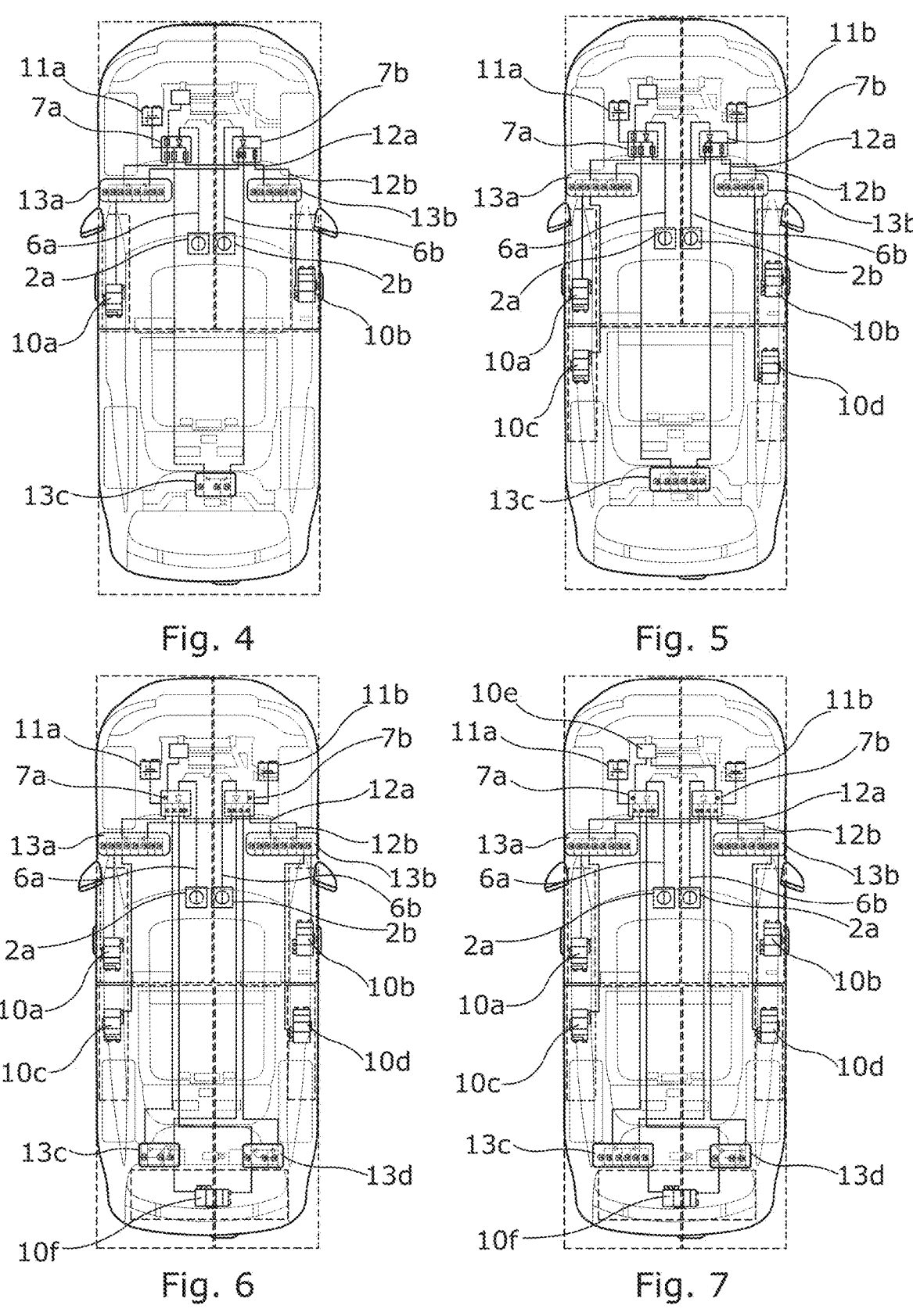

In another example, FIG. 3 shows a vehicle power distribution circuit for a two zone EE architecture, with loads 10a, 10b being sub-zone controllers for two door modules. FIG. 4 shows a vehicle power distribution circuit for a three zone EE architecture. In this arrangement, the sub-zone controllers 10a, 10b are supplied from the secondary distribution units 13a, 13b, with the tailgate module having a dual power supply through the respective secondary distribution unit 13c. FIG. 5 shows a similar power distribution circuit to that shown in FIG. 4, except that a further back-up battery supply 11b is provided, and further sub-zone controllers 10c, 10d in the form of left and right rear door modules are fed from the secondary distribution units 13a, 13b. FIGS. 6 and 7 show two variants of power distribution circuits for four zone EE architectures. In FIG. 7, the load 10e receives a dual power supply, and in FIGS. 6 and 7, the tailgate module 10f is supplied through a dual-power supply from secondary distribution units 13c, 13d.

Accordingly, embodiments of the invention may provide power distribution circuits in different scaled arrangements for various zonal EE architecture configurations. As such, vehicles with different equipment levels may be accommodated. Furthermore, arrangements can also be scaled for supporting special requirements based on Functional Safety (FuSa) or autonomous driving concepts. Moreover, embodiments may be applied to different powertrain systems, such as full electric, hybrid, and combustion engine vehicles.

It will be understood that the embodiment illustrated above show an application only for the purposes of illustration. In practice, embodiments may be applied to many different configurations, the detailed embodiments being straightforward for those skilled in the art to implement.

For example, embodiments may incorporate smart prefuse boxes, conventional melting fuse boxes, or hybrid circuit protection systems which comprise both convention and smart fuses. For instance, FET switches may be used for overcurrent protection.

What is claimed is:

1. A circuit comprising:
a power source input for receiving an input current having an input voltage;
a first branch and a second branch, each branch being connected to the power source input and each branch comprising:
a converter for converting the input current to an output current; and
a first distribution unit connected to the respective converter for receiving the output current, the first distribution unit comprising a plurality of first outputs for supplying power to a plurality of loads; and
a second distribution unit connected to one of the first outputs of the first branch and comprising a plurality of second outputs for supplying power to a plurality of second loads;
wherein the second distribution unit is further connected to one of the first outputs of the second branch, and wherein the plurality of second outputs comprises:
at least one dual power second output, the at least one dual power second output being connected to the first outputs of both the first and second branches for receiving power for supplying its respective second load; and
at least one single power second output, the at least one single power second output being connected to the first output of one of the first and second branches for receiving power for supplying their respective second loads from the one branch alone.

2. The circuit according to claim 1, wherein at least one of the loads supplied by the first distribution unit of the first branch is a primary module, and at least one of the loads supplied by the first distribution unit of the second branch is a back-up module to the primary module.

3. The circuit according to claim 2, further comprising:
the primary module; and
the back-up module,
wherein the primary module is connected to the first distribution unit of the first branch and the back-up module is connected to the first distribution unit of the second branch.

4. The circuit according to claim 1, wherein at least one of the plurality of loads is configured to be connected to the first distribution units of both the first and second branches for being supplied power thereby.

5. The circuit according to claim 1, further comprising:
a back-up energy store connected to at least one of the first distribution units for supplying power to its respective plurality of first outputs in the absence of the output current from the respective converter.

6. The circuit according to claim 1, wherein at least one of the first outputs of the first distribution units comprises:
a circuit protection device for disconnecting a respective load from the output.

7. The circuit according to claim 1, wherein at least one of the first and second branches comprise:
a switch for selectively disconnecting the respective first distribution units from the respective converter.

8. The circuit according to claim 1, wherein at least one of the second outputs of the second distribution unit comprises:
a circuit protection device for disconnecting a respective load from the output.

9. The circuit according to claim 1, further comprising:
a plurality of second distribution units, wherein the plurality of second distribution units are for location at different zones of a vehicle.

10. The circuit according to claim 9, wherein at least one of the second outputs of the second distribution units in different zones are for supplying power to corresponding second loads associated with the respective vehicle zone.

11. A circuit comprising:
a power source input for receiving an input current having an input voltage;
a first branch and a second branch, each branch being connected to the power source input and each branch comprising:
a converter for converting the input current to an output current; and
a distribution unit connected to the converters of the first and second branches for receiving their output currents, the distribution unit comprising a plurality of outputs for supplying power to a plurality of loads, wherein the outputs comprise at least one dual power output, and wherein the dual power output is connected to both the first and second branches for receiving power for supplying their respective loads; and
a second distribution unit connected to one of the first outputs of the first branch and comprising a plurality of second outputs for supplying power to a plurality of second loads;
wherein the second distribution unit is further connected to one of the first outputs of the second branch, and wherein the plurality of second outputs comprises:
at least one dual power second output, the at least one dual power second output being connected to the first outputs of both the first and second branches for receiving power for supplying its respective second load; and
at least one single power second output, the at least one single power second output being connected to the first output of one of the first and second branches for receiving power for supplying their respective second loads from the one branch alone.

12. The circuit according to claim 11, wherein at least one of the loads supplied by the first distribution unit of the first branch is a primary module, and at least one of the loads supplied by the first distribution unit of the second branch is a back-up module to the primary module.

13. The circuit according to claim 12, further comprising:
the primary module; and
the back-up module,
wherein the primary module is connected to the first distribution unit of the first branch and the back-up module is connected to the first distribution unit of the second branch.

14. The circuit according to claim 11, wherein at least one of the plurality of loads is connected to the first distribution units of both the first and second branches for being supplied power thereby.

15. The circuit according to claim 11, further comprising:
a back-up energy store connected to at least one of the first distribution units for supplying power to its respective plurality of first outputs in the absence of the output current from the respective converter.

16. The circuit according to claim 11, wherein at least one of the first and second branches comprise:

a switch for selectively disconnecting the respective first distribution units from the respective converter.

* * * * *